(12) United States Patent
Stoimenov et al.

(10) Patent No.: US 11,132,992 B2
(45) Date of Patent: Sep. 28, 2021

(54) ON-DEVICE CUSTOM WAKE WORD DETECTION

(71) Applicant: Microsoft Technology Licensing, LLC, Redmond, WA (US)

(72) Inventors: Emilian Stoimenov, Bellevue, WA (US); Rui Zhao, Bellevue, WA (US); Kaustubh Prakash Kalgaonkar, Bellevue, WA (US); Ivaylo Andreanov Enchev, Redmond, WA (US); Khuram Shahid, Seattle, WA (US); Anthony Phillip Stark, Redmond, WA (US); Guoli Ye, Sammamish, WA (US); Mahadevan Srinivasan, Bellevue, WA (US); Yifan Gong, Sammamish, WA (US); Hosam Adel Khalil, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 55 days.

(21) Appl. No.: 16/522,416

(22) Filed: Jul. 25, 2019

(65) Prior Publication Data

US 2020/0349927 A1 Nov. 5, 2020

Related U.S. Application Data

(60) Provisional application No. 62/843,543, filed on May 5, 2019.

(51) Int. Cl.
*G10L 15/00* (2013.01)
*G10L 15/16* (2006.01)
(Continued)

(52) U.S. Cl.
CPC ............... *G10L 15/16* (2013.01); *G06N 3/08* (2013.01); *G10L 17/24* (2013.01); *G10L 2015/088* (2013.01)

(58) Field of Classification Search
CPC ... G10L 15/16; G10L 17/24; G10L 2015/088; G10L 15/07; G10L 15/063; G06N 3/08; (Continued)

(56) References Cited

U.S. PATENT DOCUMENTS 6,272,463 B1 8/2001 Lapere
8,719,039 B1 5/2014 Sharifi
(Continued)

FOREIGN PATENT DOCUMENTS

EP 3321930 A1 5/2018
WO 2014035394 A1 3/2014

OTHER PUBLICATIONS

Graves, Alex, "Sequence transduction with Recurrent Neural Networks", In Repository of arXiv:1211.3711, Nov. 14, 2012, 9 Pages.
(Continued)

*Primary Examiner* — Charlotte M Baker
(74) *Attorney, Agent, or Firm* — Schwegman Lundberg & Woessner, P.A.

(57) ABSTRACT

Generally discussed herein are devices, systems, and methods for on-device detection of a wake word. A device can include a memory including model parameters that define a custom wake word detection model, the wake word detection model including a recurrent neural network transducer (RNNT) and a lookup table (LUT), the LUT indicating a hidden vector to be provided in response to a phoneme of a user-specified wake word, a microphone to capture audio, and processing circuitry to receive the audio from the microphone, determine, using the wake word detection model, whether the audio includes an utterance of the
(Continued)

user-specified wake word, and wake up a personal assistant after determining the audio includes the utterance of the user-specified wake word.

15 Claims, 12 Drawing Sheets

(51) Int. Cl.
    *G06N 3/08* (2006.01)
    *G10L 17/24* (2013.01)
    *G10L 15/08* (2006.01)

(58) Field of Classification Search
    CPC ...... G06N 7/005; G06N 3/084; G06N 3/0445; G06N 3/0454
    USPC ................ 704/231, 246, 247, 251, 252, 275
    See application file for complete search history.

(56) References Cited

U.S. PATENT DOCUMENTS

| | | | |
|---|---|---|---|
| 9,263,042 | B1 | 2/2016 | Sharifi |
| 9,275,637 | B1 | 3/2016 | Salvador et al. |
| 9,697,828 | B1 | 7/2017 | Prasad et al. |
| 2013/0339028 | A1 | 12/2013 | Rosner et al. |
| 2014/0012586 | A1 | 1/2014 | Rubin et al. |
| 2014/0278390 | A1 | 9/2014 | Kingsbury et al. |
| 2015/0154953 | A1 | 6/2015 | Bapat et al. |
| 2015/0243275 | A1 | 8/2015 | Luan et al. |
| 2016/0180838 | A1 | 6/2016 | Parada San Martin et al. |
| 2016/0328949 | A1 | 11/2016 | Zhong |
| 2016/0343272 | A1 | 11/2016 | Roche |
| 2017/0025125 | A1 | 1/2017 | Alvarez Guevara |
| 2017/0148429 | A1 | 5/2017 | Hayakawa |
| 2018/0018973 | A1 | 1/2018 | Moreno et al. |
| 2018/0158449 | A1 | 6/2018 | Tang |
| 2018/0308472 | A1* | 10/2018 | Lopez Moreno ..... G06F 16/636 |
| 2019/0027138 | A1 | 1/2019 | Wang et al. |
| 2019/0051299 | A1 | 2/2019 | Ossowski et al. |
| 2019/0115011 | A1 | 4/2019 | Khellah et al. |
| 2019/0164538 | A1 | 5/2019 | Seo et al. |
| 2019/0362711 | A1 | 11/2019 | Nosrati et al. |
| 2020/0027444 | A1* | 1/2020 | Prabhavalkar .......... G10L 15/16 |
| 2020/0273449 | A1 | 8/2020 | Kumar et al. |
| 2020/0349924 | A1 | 11/2020 | Stoimenov et al. |
| 2020/0349925 | A1 | 11/2020 | Shahid et al. |
| 2021/0055778 | A1 | 2/2021 | Myer et al. |

OTHER PUBLICATIONS

He, et al., "Streaming Small-Footprint keyword Spotting using Sequence-to-Sequence Models", In Repository of arXiv:1710.09617, Oct. 26, 2017, 8 Pages.

"International Search Report & Written Opinion issued in PCT Application No. PCT/US20/024525", dated Jul. 30, 2020, 17 Pages.

"International Search Report & Written Opinion issued in PCT Application No. PCT/US20/025086", dated Jul. 6, 2020, 13 Pages.

Boo et al., "On-Device End-to-end Speech Recognition with Multi-Step Parallel Rnns", In IEEE Spoken Language Technology Workshop (SLT), Dec. 18, 2018, pp. 376-381.

Kepuska et al., "Improving Wake-Up-Word and General Speech Recognition Systems", In IEEE 15th Intl Conf on Dependable, Autonomic and Secure Computing, 15th Intl Conf on Pervasive Intelligence and Computing, 3rd Intl Conf on Big Data Intelligence and Computing and Cyber Science and Technology Congress(DASC/PiCom/DataCom/CyberSciTech), Nov. 6, 2017, pp. 318-321.

"International Search Report and Written Opinion Issued in PCT Application No. PCT/US2020/024523", dated May 28, 2020, 15 Pages.

Cutler, et al.,"Patterns of English Phoneme Confusions by Native and Non-Native Listeners", In the Journal of the Acoustical Society of America, vol. 116, Issue 6, Dec. 2004, pp. 3668-3678.

"Phone (phonetics)", Retrieved From: https://web.archive.org/web/20190527000131/https://en.wikipedia.org/wiki/Phone_(phonetics), May 27, 2019, 2 Pages.

Wen, et al., "Cortana SDK 2nd Pass Keyword Spotter (KWS)", Retrieved From: https://speechwiki.azurewebsites.net/architecture/cortana-sdk-2nd-pass-keyword-spotter.html, May 6, 2019, 5 Pages.

Wells, et al., "Quickstart: Run the Speech Devices SDK Sample App on Android", Retrieved From: https://docs.microsoft.com/en-us/azure/cognitive-services/Speech-Service/speech-devices-sdk-android-quickstart, Jul. 5, 2019, 11 Pages.

Miller, et al., "An Analysis of Perceptual Confusions Among Some English Consonants", In the Journal of the Acoustical Society of America, vol. 27, Issue 2, Mar. 1955, pp. 338-352.

Quazi, et al., "System Combination Architecture & Plan", Retrieved From: https://speechwiki.azurewebsites.net/architecture/system-combination-architecture.html, May 6, 2019, 2 Pages.

Wells, et al., "Create a Custom Wake Word by Using the Speech Service", Retrieved From: https://web.archive.org/web/20191003175641/https://docs.microsoft.com/en-us/azure/cognitive-services/speech-service/speech-devices-sdk-create-kws, Jul. 5, 2019, 4 Pages.

"Non Final Office Action issued in U.S. Appl. No. 16/522,427", dated Mar. 25, 2021, 28 Pages.

Karanasou, P., "Phonemic Variability and Confusability in Pronunciation Modeling for Automatic Speech Recognition", In Doctoral Thesis of Paris-South University, Paris-SUD Doctoral School of Computing, Jun. 11, 2013, 121 Pages.

Vilares, M., et al., "Phrase Similarity through the Edit Distance", In Proceedings of International Conference on Database and Expert Systems Applications, Aug. 30, 2004, pp. 306-317.

"Non Final Office Action issued in U.S. Appl. No. 16/522,401", dated Feb. 18, 2021, 15 Pages.

"Notice of Allowance Issued in U.S. Appl. No. 16/522,401", dated Jun. 23, 2021, 14 Pages.

* cited by examiner

FIG. 6

ON-DEVICE CUSTOM WAKE WORD DETECTION

RELATED APPLICATION

This application claims the benefit of priority to U.S. Provisional Patent Application Ser. No. 62/843,543, filed on May 5, 2019, and titled "On-Device Custom Wake Word Detection", which is incorporated herein by reference in its entirety.

BACKGROUND

The use of automatic personal assistants has grown significantly. A personal assistant is an application or service that retrieves information, executes a task, or initiates execution of a task on behalf of a user, sometimes after a device detects that a user has uttered a wake word. Users can communicate with such personal assistants using a conversational interface, such as a microphone and speaker.

SUMMARY

The following presents a shortened summary of various aspects of this disclosure in order to provide a basic understanding of such aspects. This summary is not an extensive overview of all contemplated aspects and is intended to neither identify key or critical elements nor delineate the scope of such aspects. Its purpose is to present some concepts of this disclosure in a compact form as a prelude to the more detailed description that is presented later.

In one aspect of the present disclosure, systems and methods are disclosed for on-device customized wake word detection. In one instance a device can include memory including model parameters that define a recurrent neural network transducer (RNNT) wake word detection model and a lookup table (LUT) indicating a hidden vector to be generated in response to a phoneme of a user-specified wake word, a microphone to capture audio, processing circuitry to receive the audio from the microphone, determine, using the wake word detection model, whether the audio includes an utterance of the wake word, and perform a task indicated in the audio after the wake word. The wake word detection model can be trained using standard phonemes and whole word phonemes.

The processing circuitry can reset the wake word detection model to erase a history of processed audio. The reset can occur in response to determining one of the wake word was uttered and a specified period of time has elapsed. The wake word detection model can be compressed using single value decomposition (SVD). The wake word detection model can include weights quantized to 8-bit or 16-bit values. The processing circuitry can receive the wake word from a user, provide the wake word to a wake word model engine, and receive from the wake word model engine, a wake word graph of the wake word indicating a phoneme sequence of the wake word and alternate pronunciations of the wake word and a background language model with unigrams and bi-grams of the wake word removed therefrom, wherein the wake word graph and the background language model are part of the wake word detection model.

BRIEF DESCRIPTION OF DRAWINGS

FIG. 6 illustrates, by way of example, a flow diagram of a decomposition of a weight matrix of a neural network (NN) model into two matrices with smaller dimensions.

DETAILED DESCRIPTION

Figure 1:
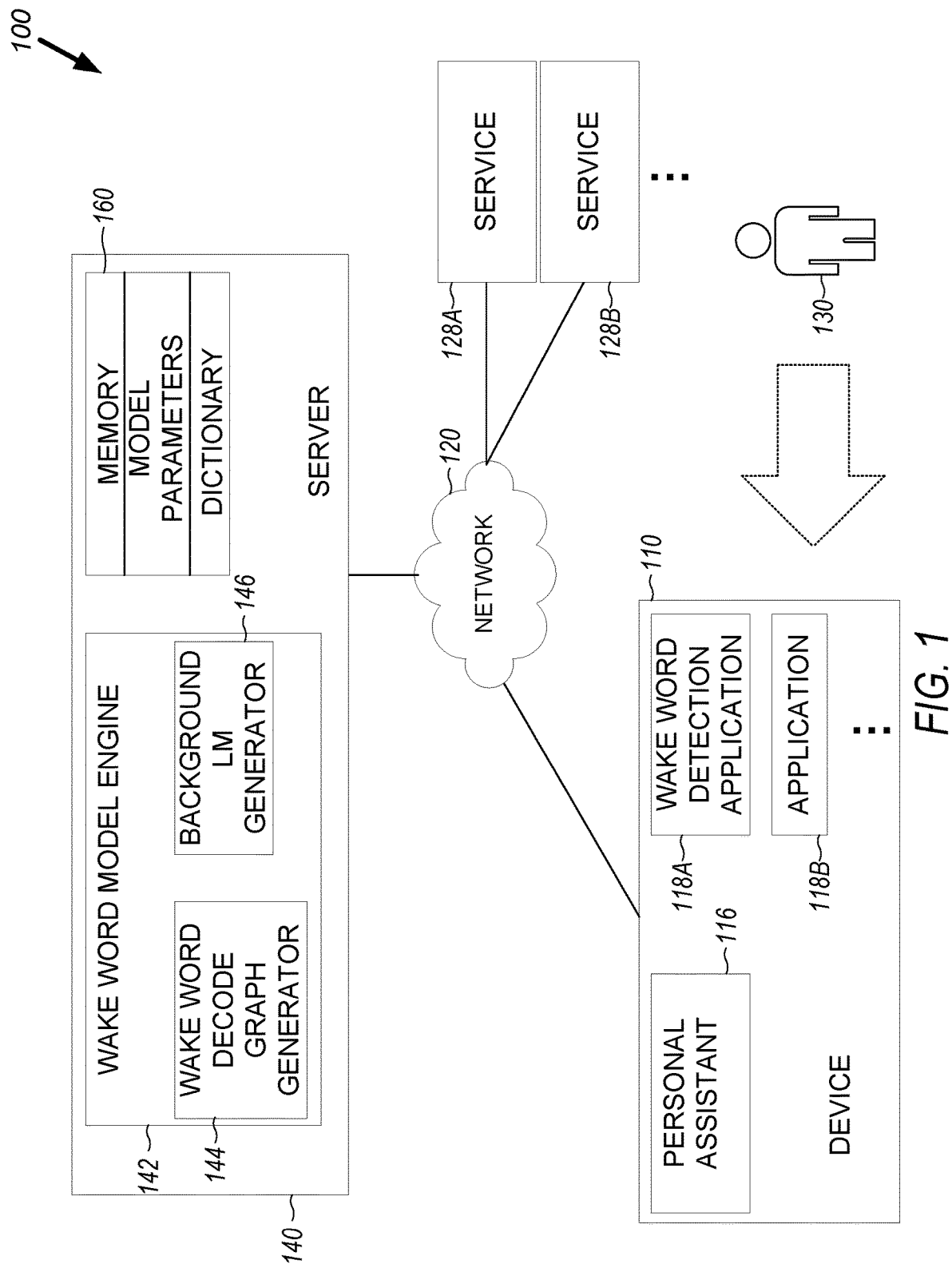
FIG. 1 illustrates, by way of example, a logical block diagram of an embodiment of a system.

Aspects and implementations of the present disclosure are directed to detecting whether a user has uttered a wake word, such as on a memory or processing bandwidth limited device.

A personal assistant and related technologies can enable a user to obtain information, execute tasks, and perform other activities. Users can interact with or control such personal assistants via conversational interfaces such as messaging, chat, audio commands, or the like. To access a personal assistant, a wake word is typically spoken. A wake word is a word or phrase that indicates, to the personal assistant, that the user is asking the personal assistant to perform a task. Wake words are typically static and pre-programmed into a personal assistant. For example, Microsoft® Corporation of Redmond, Wash., United States, has a personal assistant that can be accessed using the phrase "Hey Cortana". However, some people may not like the phrase, may use the word "Cortana" in reference to something other than the personal assistant, thus confusing the personal assistant, or may otherwise want to choose their own wake word for accessing the personal assistant. Such user-chosen wake words are called "custom wake words" herein.

However, detecting a custom (user-defined) wake word is challenging for a number of reasons. One reason is that an efficient model for detecting the wake word may not readily exist. Another reason is that a general speech recognition (SR) model may be prohibitively large for storing and executing on a memory or processing bandwidth limited device. The model may further cause latency that frustrates a user attempting to use the personal assistant.

Wake word detection can be an important part of voice interfaces (such as a personal assistant). Advances in wake word detection focus on training low-complexity models (e.g., models that consume small amounts of memory or processing circuitry bandwidth) that detect an utterance of a predetermined static wake word. The prior pretrained models require large amounts of wake word samples and training to be effective. The models for detection of such custom wake words can be difficult or impossible to build due to either data sparsity, computational demands for training, or both. Embodiments herein provide a system capable of detecting custom user-defined wake words, such as on memory or processing bandwidth limited devices.

Unlike static wake word-dependent models, embodiments include an efficient model, trained from readily available general-purpose speech data, that can be tailored to recognize a user-defined wake word without retraining. A customization of the model can take place as part of the system setup before deployment. The customization can include a customized decoding graph or a lookup table (LUT) that decodes for the wake word.

Embodiments herein do not need specialized training. Instead, embodiments include a general acoustic model (AM) (e.g., a connectionist temporal classification (CTC) network) and language model (LM) or something that performs operations of the AM and LM (e.g., a recurrent neural network transducer (RNN-T)). Embodiments can help detect a custom wake word using a decoding graph that is customized to the wake word. A decoder can receive the output from the AM, LM, and decoding graph to determine whether it is likely that the custom wake word was uttered.

One or more operations can be performed on the acoustic model (AM) of a custom wake word detector to reduce its size. Such operations can include a singular value decomposition (SVD) or quantization. The AM can be used in conjunction with an adaptable background language model (BLM) and wake word graph. Embodiments with such structures can provide a high CA and low FA custom wake word detection system.

One or more embodiments can employ a general acoustic model (AM) that does not need wake word-specific training. To run on low-power hardware, this model can be compressed by SVD (singular value decomposition) and quantized (e.g., to 8 bits, 16 bits, or the like, per weight). The CTC can be used in conjunction with an adaptable background language model (BLM) and keyword graph to build a high correct acceptance (CA) and low false acceptance (FA) custom keyword detection system.

Accordingly, described herein in various implementations are technologies, including methods, machine-readable mediums, and systems, that enable on-device detection of a custom wake word.

It can therefore be appreciated that the described technologies are directed to and address specific technical challenges and longstanding deficiencies in multiple technical areas, including but not limited to communication interfaces, semantic relationships, and personal assistants. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

FIG. 1 illustrates, by way of example, a diagram of an embodiment of a system 100. As shown, the system 100 includes device 110 which can be a laptop computer, a desktop computer, a terminal, a mobile phone, a tablet computer, a smart watch, a digital music player, a server, a smart speaker, and the like. User 130 can be a human user who interacts with device 110. For example, user 130 can provide various inputs (e.g., via an input device/interface such as a keyboard, mouse, touchscreen, microphone, etc.) to device 110. Device 110 can also display, project, and/or otherwise provide content to user 130 (e.g., via output components such as a screen, speaker, etc.).

As shown in FIG. 1, device 110 can include personal assistant 116. Personal assistant 116 can be an application or module that configures/enables the device 110 to interact with, provide content to, and/or otherwise perform operations on behalf of user 130. For example, personal assistant 116 can receive communications and/or request(s) from user 130 and present/provide responses to such request(s) (e.g., within a conversational or 'chat' interface). In certain implementations, personal assistant 116 can also identify content that can be relevant to user 130 (e.g., based on a location of the user or other such context) and present such content to the user. Personal assistant 116 can also enable user 130 to initiate and/or configure other application(s) (e.g., application 118A, as described below). For example, personal assistant 116 can initiate an application (e.g., a media player application, a web search application, a navigation application, or the like) that fulfills a request provided by the user. Personal assistant 116 can also initiate or perform various other operations, some of which are described herein.

Figure 12:
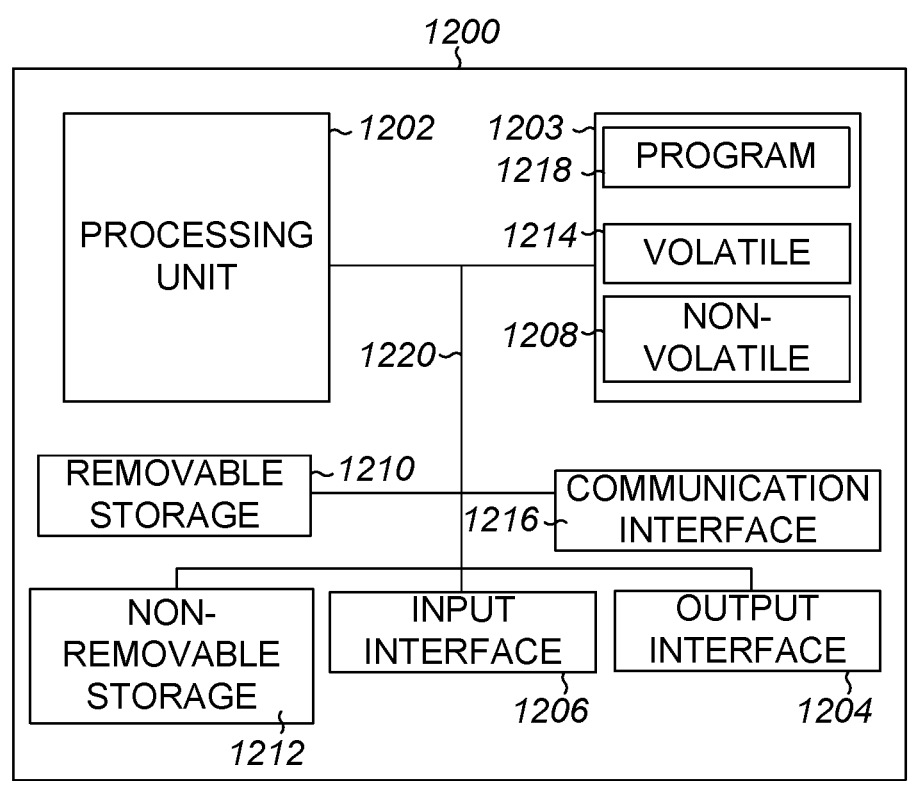
FIG. 12 illustrates, by way of example, a block diagram of an embodiment of a machine (e.g., a computer system) to implement one or more embodiments.

As shown in FIG. 1, device 110 can also include various applications, programs, modules, or the like, such as wake word detection application 118A and application 118B. The referenced applications can be stored in memory of device 110 (e.g., memory 1103 as depicted in FIG. 12 and described below). One or more processor(s) of device 110 (e.g., processing unit 1102 as depicted in FIG. 12 and described below) can execute such application(s). In doing so, device 110 can be configured to perform various operations, present content to user 130, etc. Examples of such applications include but are not limited to: social media/messaging applications, applications that facilitate transactions (e.g., food purchases), etc.

It should also be noted that while various components (e.g., personal assistant 116, application 118B, etc.) are depicted (e.g., in FIG. 1) as operating on device 110, this is only for the sake of clarity. However, in other implementations the referenced components (e.g., application 118B) can also be implemented on other devices/machines. For example, in lieu of executing locally at device 110, application 118B (e.g., a ride-sharing application) can be implemented remotely (e.g., on a server device or within a cloud service or framework).

As also shown in FIG. 1, device 110 can connect to and/or otherwise communicate with server 140 via network 120. Network 120 can include one or more networks such as the Internet, a wide area network (WAN), a local area network (LAN), a virtual private network (VPN), an intranet, and the like.

Server 140 can be, for example, a server computer, computing device, storage service (e.g., a 'cloud' service), etc., and can include wake word model engine 142 and memory 160. The wake word model engine 142 can execute an application thereof (e.g., the wake word decode graph generator 144 or the background LM generator 146) using processing circuitry (e.g., processing unit 1102 as depicted in FIG. 12 and described below).

The wake word model engine 142 can include an application or module that configures/enables server 140 to perform various operations such as are described herein. For example, wake word model engine 142 can configure/enable server 140 to receive a message indicating a requested wake word was detected, such as from the device 110. The message can be received through the network 120. The wake word model engine 142 can generate a wake word graph, such as by using the wake word graph generator 144.

Unlike static wake word-dependent models, embodiments can include an efficient model, trained from readily available general-purpose speech data, that can be tailored to recognize a user-defined wake word without retraining. A customization of the model can take place as part of the system setup before deployment. The customization can be performed by the wake word model engine 142 with input from the device 110.

The device 110 can provide a message to the server 140, such as through a web portal connected to the server 140. The message can indicate that the custom wake word was detected in audio, such as by the wake word detection application 118A. The server 140 can execute a wake word model engine 142. The wake word model engine (sometimes called processing circuitry) can use a wake word graph from a wake word graph generator 144 and a background LM from a background LM generator 146 to determine whether the wake word was present in the audio.

The custom wake word graph generated by the wake word decode graph generator 144 can optionally decode alternative plausible pronunciations for the custom wake word. The alternative plausible pronunciations can be included in the custom wake word graph (e.g., decoding graph 332).

The background LMs generated by the background LM generator 146 can include a pruned or unpruned version of a pre-existing background LM (BLM). Pruning can remove the wake word (and alternative pronunciations) therefrom. The BLM can include an n-gram language model, where n is an integer greater than zero (0). If the BLM is static, no changes are made between deployments. If the BLM is dynamic, the custom wake word and pronunciations thereof can be removed from therefrom.

The user 130 can enter the custom wake word using a web portal connected to the server 140. The server 140 can execute the custom wake word decode graph generator 144 and optionally operation a background model generator 146. The custom wake word graph generated by the wake word decode graph generator 144 can optionally identify or determine alternative plausible pronunciations for the custom wake word.

The background LM generator 146 can prune a pre-existing background LM to remove the wake word (and alternative pronunciations) therefrom. The wake word model engine 142 can package the custom wake word graph, the customized or standard BLM, and the standard AM in a form suitable for deployment, such as an executable file, a disk image file (DMG), or the like. The wake word detection application 118A can include the deployed, customized wake word package.

Using the portal relieves the user 130 from setting up and deploying complicated tools for customizing the wake word graph or BLM, simplifies the model deployment flow, and allows for easy updates of the components of the model.

As a wake word graph and a pruning of the BLM are quick operations, the latency in customizing the device wake word detection in this manner is small. A user can specify a wake word and be using the custom wake word to access their personal assistant within minutes.

Figure 2:
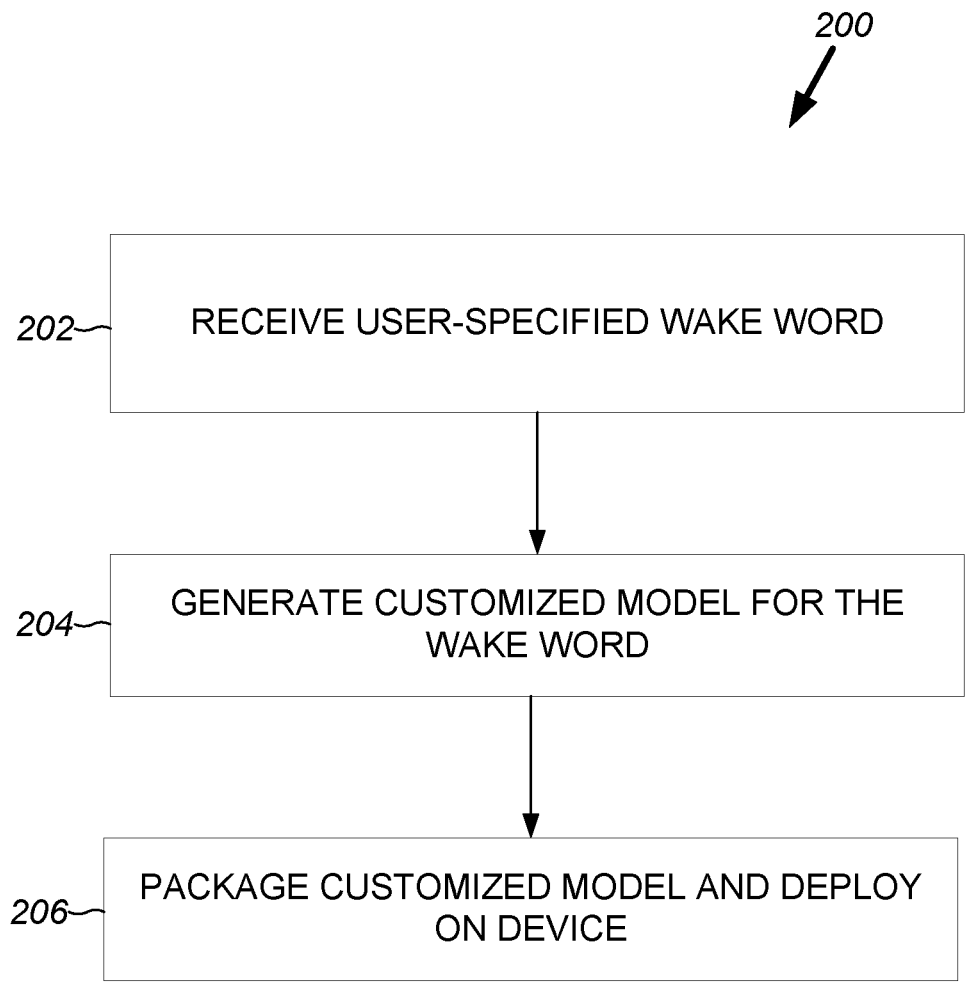
FIG. 2 illustrates, by way of example, a flow diagram of an embodiment of a method for wake word detection model customization.

FIG. 2 illustrates, by way of example, a diagram of an embodiment of a method 200 for wake word detection model customization. The method 200 as illustrated includes receiving a user-specified wake word, at operation 202; generating a customized model for the received wake word, at operation 204; and packaging the generated customized model and deploying the customized model on the device 110, at operation 206. The wake word can be specified in plain text at operation 202. The customized model can be generated without retraining so as to reduce latency between receiving the wake word at operation 202 and generating the customized model at operation 204.

The customized model can include at least one static component and at least one dynamic component. The static component can include an acoustic model (AM) 330 (see FIG. 3). The AM 330 can be compressed or otherwise configured for efficient operation in a number of ways, including at least one of (1) NN layer quantization; (2) frame skipping; (3) frame stacking; (4) single value decomposition (SVD); and (5) frame batching. Each of these is discussed elsewhere herein. A confidence classifier (part of a beam search decoder 338) can be static. The confidence classifier can be used to assign a score that, based on a score value relative to a threshold, determines whether the audio includes an utterance of the wake word. NN layer quantization, SVD, frame skipping, frame stacking, and frame batching are discussed with regard to FIGS. and elsewhere herein.

A background language model (BLM) can be either static or dynamic. If the BLM is dynamic, the wake word can be removed from therefrom. To generate the BLM, a large general-purpose n-gram language model can be reduced by an entropy-based pruning to reduce its size. After the user specifies the wake word, the unigrams and n-grams containing that wake word can be removed from the model. This language model can be converted to a graph, with each word replaced by its phoneme pronunciation. This graph can then be determinized and minimized.

A custom wake word graph is a dynamic component. The custom wake word graph can include a phoneme graph of the custom wake word that, when traversed indicates that the custom wake word has been uttered. The custom wake word graph can account for different pronunciations of the same word or even for multiple custom wake words. After the user specifies the custom wake word, a unified trained text normalization and letter-to-sound system can produce a list of plausible pronunciations for the custom wake word. This list can then be compiled into a graph, which can then be determinized and minimized.

The custom wake word can be detected using a decoding graph 341 that is a union of an (adapted) background language model graph 334 and a custom wake word specific decoding graph 332. The beam search (token-passing) decoder 338 can then use output of the CTC AM 330 along with the decoding graph 341 to match the input audio to the wake word. The wake word can be detected if a token reaches the graph end state, the token's accumulated acoustic and language model score is larger than a relative score, and the confidence classifier output is larger than a predefined threshold.

Figure 3:
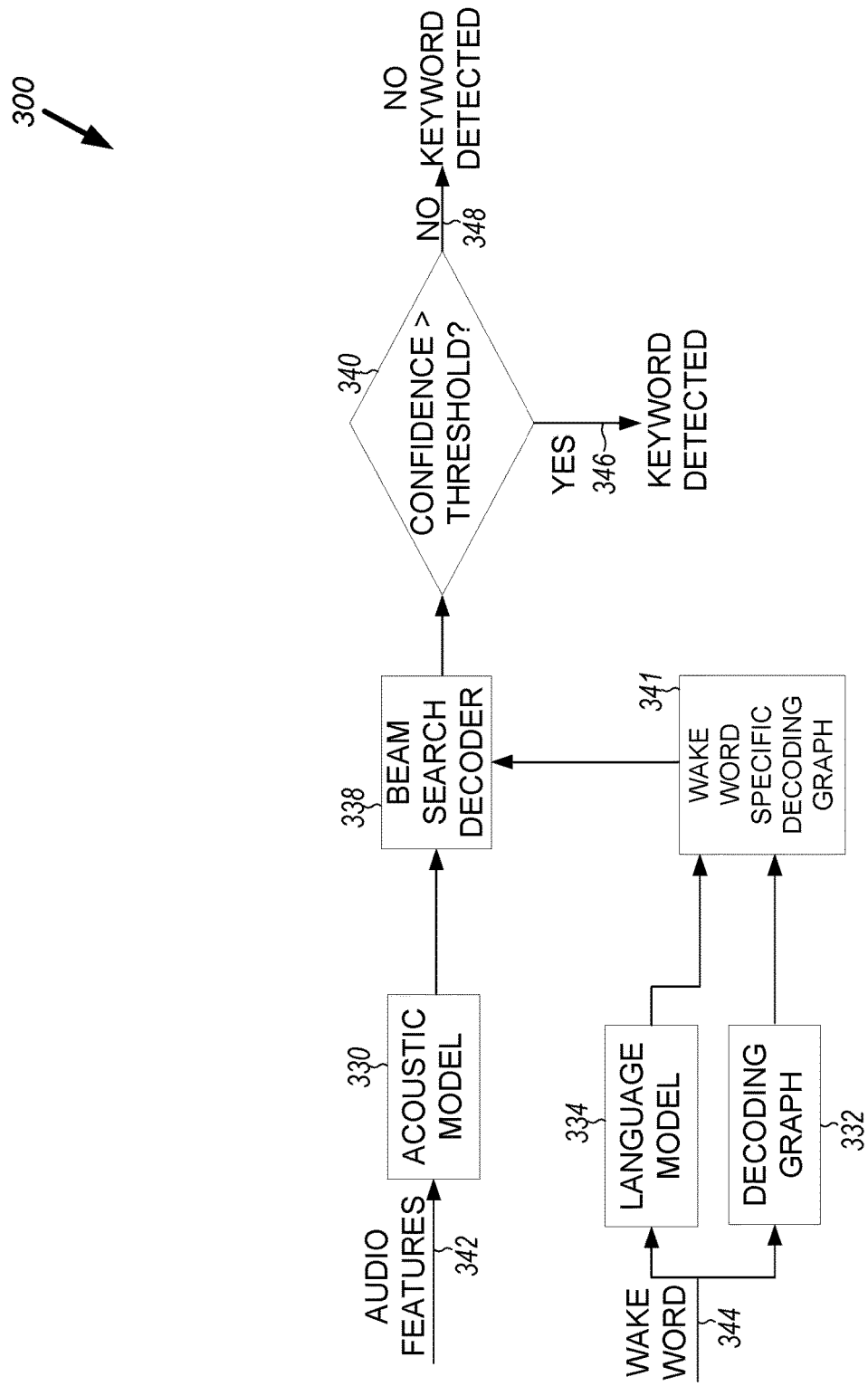
FIGS. 3-5 illustrate, by way of example, logical block diagrams of respective embodiments of at least a portion of wake word detection systems.
Figure 4:
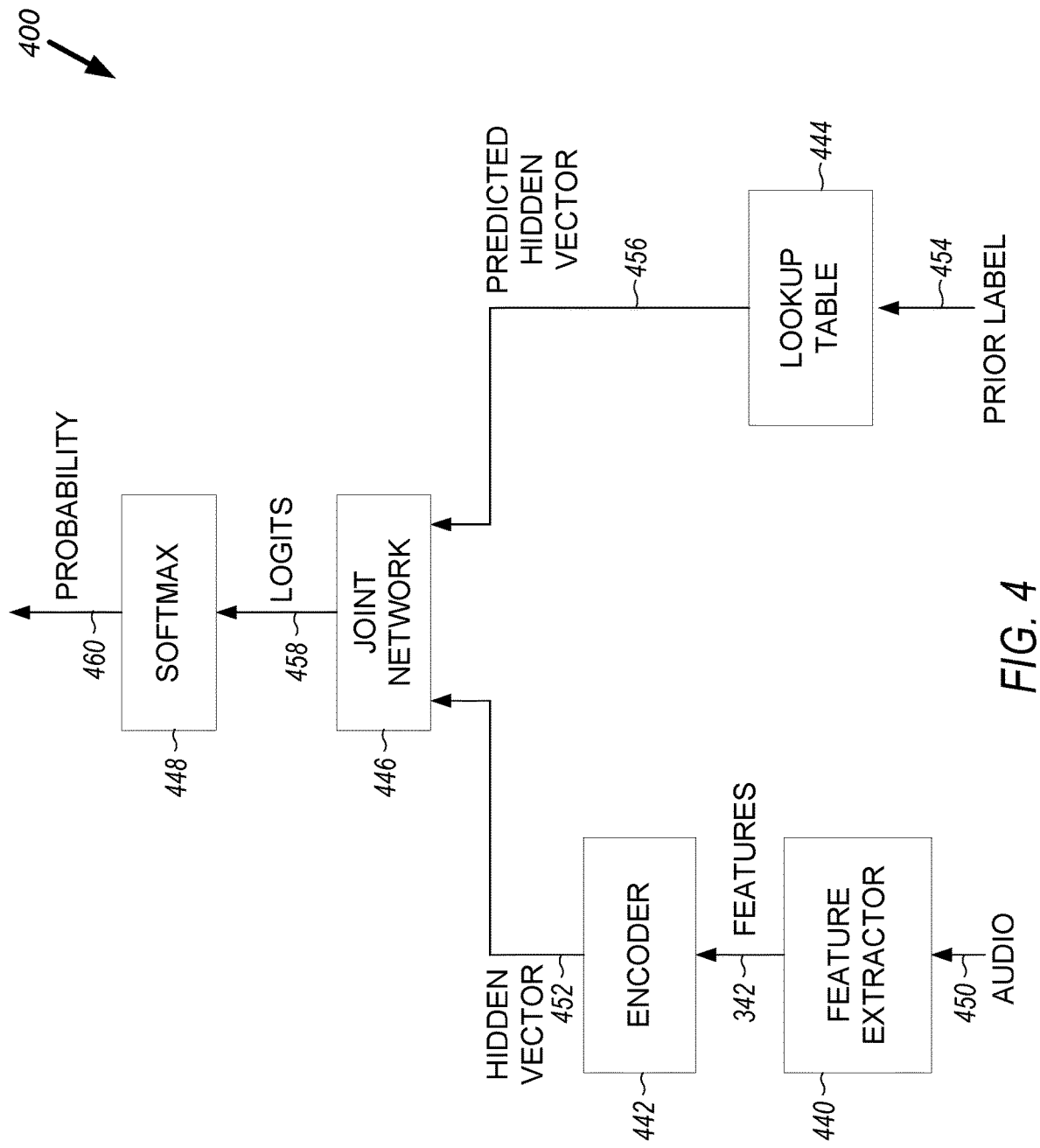
Figure 5:
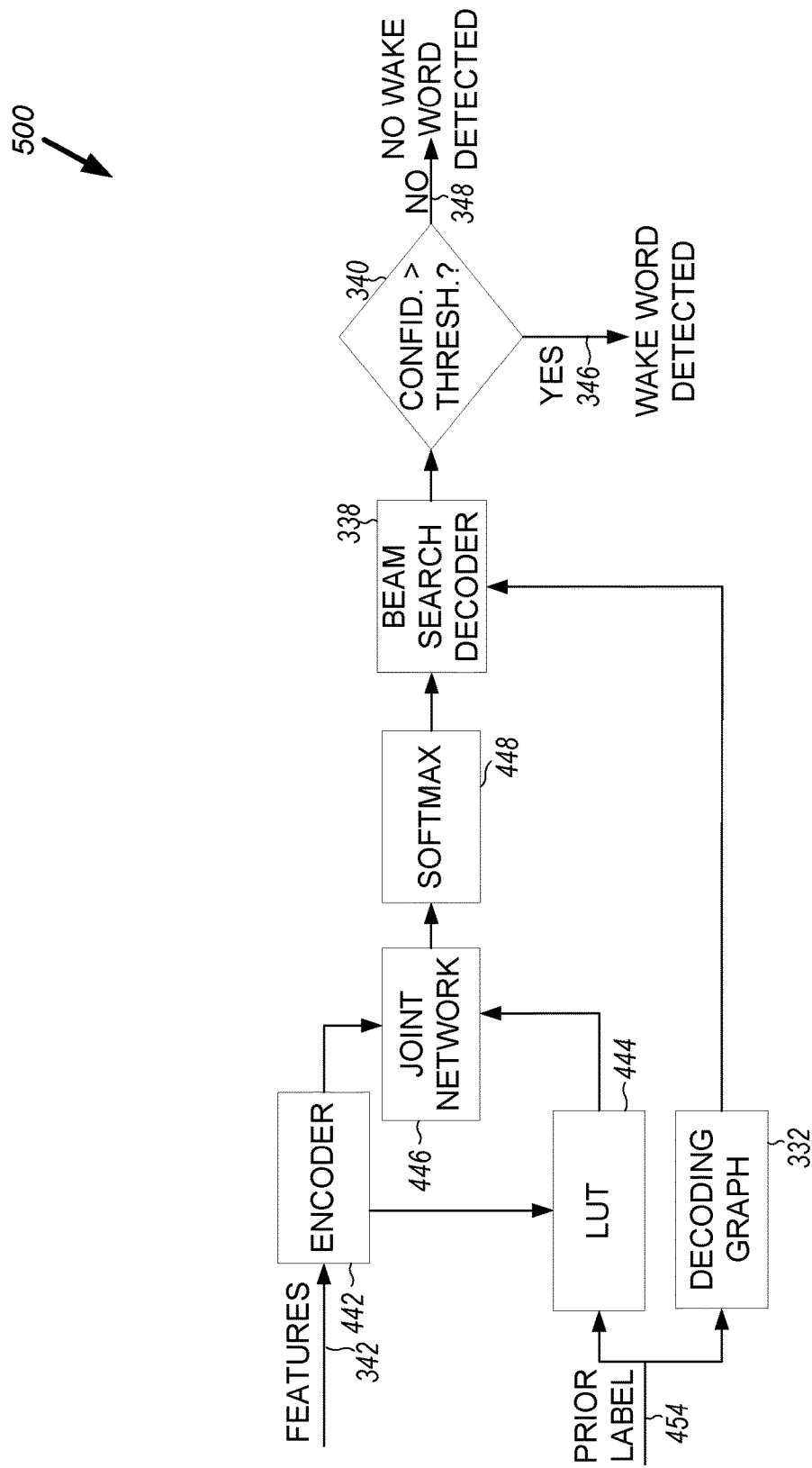

FIGS. 3, 4, and 5 illustrate, by way of example, diagrams of respective embodiments of at least a portion of wake word detection systems 300, 400, 500. The wake word detection systems 300, 400, 500 can be implemented by the device 110 using the wake word detection application 118A.

The system 300 as illustrated includes an AM 330, a beam search decoder 338, a background LM 334, a wake word specific decoding graph 332, and a confidence threshold check at operation 340. The AM 330 is used in SR to represent a relationship between an audio signal (features of an audio signal) and phonemes or other linguistic units that make up speech. The AM 330 is learned from a set of audio recordings or their corresponding transcripts. In some embodiments, the AM 330 can include a recurrent neural network (RNN) trained using a connectionist temporal classification (CTC) neural network (NN). CTC refers to outputs and scoring and is independent of underlying NN structure. The RNN can include long short-term memory (LSTM) units.

CTC is particularly useful when there are more observations than labels. CTC is a technique for modeling a conditional probability distribution over sequence data when frame-level alignments of the target label sequence are unknown. CTC augments the set of output targets with an additional symbol, referred to as the blank symbol. CTC models the output probability of the target sequence conditioned on the input by marginalizing over all possible frame-level alignments, where each output label is assumed to be independent of the other labels, conditioned on the input.

The CTC generates a continuous output that is trained to model the probability of the label. The CTC output can be backpropagated to update the NN weights. Alternatively, a hidden Markov model (HMM) can be used in place of the CTC. The AM 330 can receive audio features 342 and produce a series of likelihood vectors that the audio features 342 correspond to phonemes.

Static components are model components that are trained ahead of time and remain independent of the chosen keyword. A CTC model can be trained using a uniform frame-skipping training technique, where frames are stacked to form a super-vector, and then two frames are skipped. This style of training reduces the AM frame rate to a third of the original, and speeds up both training time and runtime, as only a third of the input data needs to be processed by the model without loss of information.

The AM can be trained using a teacher/student training procedure in which large and small LSTM models are trained with a cross-entropy (CE) objective function. The CE objective function in the small LSTM model can then be replaced with a connectionist temporal classification (CTC) objective function. The large LSTM model can then be used as a teacher of the small LSTM CTC model. Instead of Hidden Markov Model (HMM) states or context-dependent phonemes, the CTC model targets 26 phonemes, which helps reduce the size of the dynamic model components and ultimately the search space of the token-passing decoder.

After the model is trained, an approximated SVD matrix factorization can be applied to a "pre-nonlinear signals" calculation matrix and retrained. Depending on the approximation factor this can result in a considerable amount of compression of the model size without accuracy loss.

The floating point weights (e.g., 32-bit) in the SVD factor matrices can be quantized. This helps to compress the model size to about $1/4^{th}$ the size, which reduces the amount of data that has to be read from the main memory during execution in case the matrix weights are not already preloaded in CPU cache. This also helps to increase the efficiency of vector-matrix multiplies of single input multiple data (SIMD) processing elements in case the weights are already resident in the central processing unit (CPU) cache. Many current hardware architectures implement multiply-add SIMD operations, which can execute on registers of up to 256-bits. In case those registers contain 8-bit values, a single SIMD instruction can multiply and add 32 elements in a single cycle, 4 times more than if those registers contained 32-bit floating point values.

To preserve the NN accuracy and fully utilize the range of (−128, 127), an asymmetrical range of the values of a single matrix row can be assumed, then compressed down to the 8-bit target range. The quantized values can be stored to a disk. At runtime, the evaluation procedure is as follows input vectors are converted to 8-bit using the same asymmetrical quantization scheme, and the matrix multiplication can be performed with 8-bit SIMD instructions. The matrix product can then be converted back to floating point range (dequantized) and the matrix biases are added.

The phonemes can include standard phonemes, such as 40 or 44 standard phonemes. The phonemes can include whole word phonemes. Training the AM 330 using the standard phonemes and the whole word phonemes can help a model better recognize the words associated with the whole word phonemes.

Consider an audio data set that includes a large number of utterances of the word "x box". An ML technique trained on this audio can bias the phoneme "/b/" to the pronunciation in the word "box". This can be problematic for a wake word of "BMW", "beamer", or the like, that includes a different pronunciation of the phoneme. The NN can have trouble in detecting the "bee" sound when it is trained using an overwhelming number of words with the "bah" sound. For the word "one", the traditional phoneme sequence is "w aa n". The whole word phoneme sequence can be "w ONE1 ONE2 n". The phones "ONE1" and "ONE2" are specific phones used only for the word "one". In this way, the model can learn the phonemes for the word "one" better.

A whole word phoneme is a symbol dedicated to representing a single word and the possible multiple pronunciations thereof. The whole word phoneme can be appended to the standard phoneme set and used to train the NN. The wake word, a numerical digit (e.g., "one", "two", "three", etc.), or other word can be assigned a whole word phoneme. Consider the word "box". A phoneme deconstruction of the word "box" can be "/b/a/ks/". Instead of training the NN using this phoneme deconstruction, the symbol, @, can be replace each phoneme in the deconstruction and the NN can be trained based on "/@/@/@/". This removes bias towards the pronunciation of each of the phonemes in "box" and biases the NN towards recognition of the word "box".

The LM 334 can determine a probability of observing an $i^{th}$ gram based on a context history of the preceding n-1 grams, where n is the number of grams in the technique. The LM 334 can be trained using any words of a dictionary or all words of the dictionary minus the wake word(s). In removing the wake word, the wake word can be pruned from the LM 334. In some embodiments, the LM 334 can be a unigram LM, such as to save execution time and memory overhead.

Figure 10:
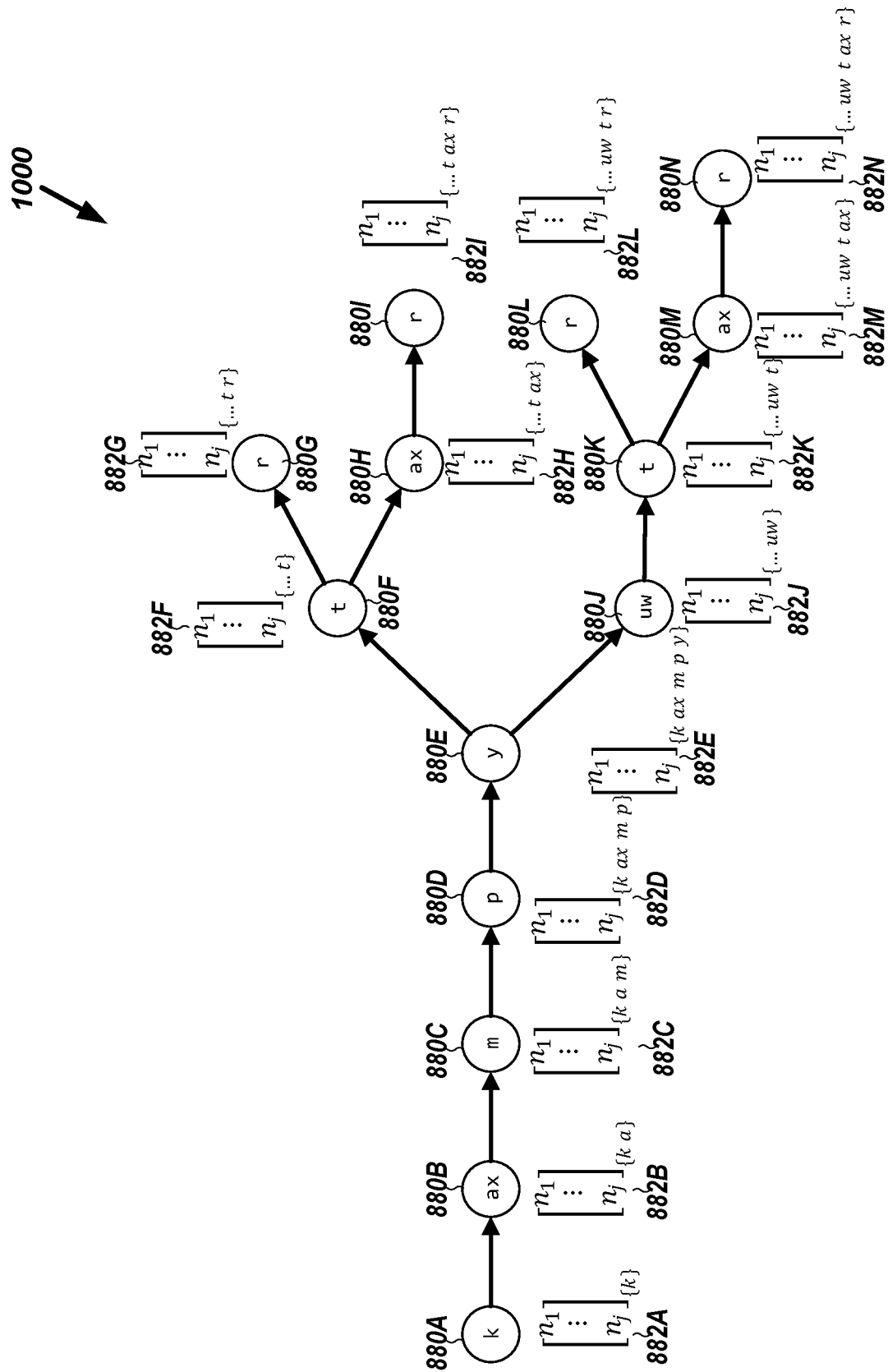
FIG. 10 illustrates, by way of example, a flow diagram of an embodiment of a beam search decoding trie for the word "computer".

The decoding graph 332 indicates the sequence of phonemes in the wake word by a directed graph or a trie (see FIG. 10). Using the decoding graph 332, a next phoneme of the wake word can be determined based on the current location in the wake word graph 332.

The wake word graph 332 is a dynamic component. The wake word graph 332 can include a phoneme graph of a wake word 344 that, when traversed indicates that the wake word 344 has been uttered. The wake word graph 332 can account for different pronunciations of the same word or even for multiple wake words. The wake word graph 332 can begin with a blank (silence) phoneme so that the wake word 344 is only detected following silence or as uttered at a beginning of a phrase.

The beam search decoder 338 can determine the likelihood that the audio features 342 correspond to an utterance of the wake word 334 based on the output of the AM 330 and the decoding graph 332. Keyword detection can occur if the best current hypothesis emanates from the keyword portion of the decoding graph 332 and not from the LM 334.

The beam search decoder 338 can include low probability hypotheses pruned from a search space. The low probability hypotheses include probabilities below a specified threshold. Using the beam-search decoder 338, a maximum number (e.g., 10, 25, 50, 100, more or fewer candidates, or some number therebetween) of scoring candidates can be retained at each decoding step.

The beam search decoder 338 implements a heuristic search algorithm that explores a graph by expanding the most promising node in a limited set. Beam search is an optimization of best-first search that reduces its memory requirements. Best-first search is a graph search which orders all partial solutions according to some heuristic. But in beam search, only a predetermined number of best partial solutions are kept as candidates.

The beam search decoder 338 can be implemented as a token-passing decoder operating on a graph of possible pronunciation hypotheses (e.g., the wake word graph 332). The wake word graph 332 can be structured as a trie, where possible prefixes are merged. Merging the prefixes can conserve memory space. Each node of the trie can represent a pronunciation prefix. The trie can include a prediction network output for that prefix. An example of such a trie is provided in FIG. 10. When the beam search decoder 338 explores the wake word graph 332, it can look up the prediction network outputs stored in those nodes based on output from the AM 330, such as if an RNNT model is used. FIG. 10 illustrates a diagram of such a trie.

A probability vector output from the beam search decoder 338 can be compared to a confidence threshold at operation 340. The confidence threshold can be set by the user 130, such as to be more or less sensitive to detection of the wake word 344. A higher confidence threshold will have fewer false acceptances (FAs) while a lower confidence threshold will have more FAs. If an entry in the beam search decoder 338 corresponding to the wake word is greater than a threshold, the keyword can be detected at operation 346. If the entry in the beam search decoder 338 corresponding to the wake word is not greater than the threshold, the keyword is not detected at operation 348.

In some embodiments, a single keyword detection is insufficient to indicate the wake word was uttered. This is, at least in part, because an output of the beam search decoder 338 can change paths mid-audio. This is, at least in part, because the probabilities of what is predicted as being in the phonemes of the audio can depend on what has been said before. By waiting until a specified number of detections (since a last start symbol) is indicated by the operation 340, fewer FAs can be triggered.

Output from the beam search decoder 338 can be provided in a streaming fashion. The output can include a start character, generally indicated by detected silence. The output can then, for each frame, determine phonemes in all the frames from the start up to the current frame, includes audio of a phoneme and generate a string corresponding thereto. The keyword can be detected at operation 346 if two predictions from the last start symbol include the wake word 344.

FIG. 4 illustrates, by way of example, a diagram of an embodiment of a system 400 for wake word detection. The system 400 can be implemented by the wake word model engine 142. In some embodiments, the AM 330 and the LM 334 can be implemented using a recurrent neural network transducer (RNNT). The system 400 is sometimes called an RNNT. The system 400 as illustrated includes a feature extractor 440, encoder 442, lookup table (LUT) 444, joint network 446, and normalizer (e.g., softmax layer 448).

The feature extractor 440 receives sampled audio 450 and produces features 342 of the frame (usually 10-30 milliseconds per frame) of the audio 450. Example features include Mel frequency cepstral coefficients, linear predictive coding coefficients, perceptual linear prediction, relative spectrum transform analysis, and gammatone log energies. Many other features can be used. The feature helps characterize the content of the frames relative to one another by compactly modeling distinct portions of the sampled audio 450.

The encoder 442 receives the features 342 and provides a hidden vector 452. The encoder 442 acts as the AM 330 and a predicted hidden vector 456 acts as the LM 334. An advantage of the system 400 is that output targets can be extracted from the system 400 in a streaming fashion. This is due, at least in part, to the system 400 operating on less than an entire encoded utterance.

The LUT 444 can store pre-computed vectors from a prediction network (e.g., a wake word graph 332). The input of the prediction network can be the last predicted label (the prior label 454). When decoding, the prediction network and joint network 446 typically need to be recalculated for different result candidates. This increases the computational cost significantly. In the systems 400, 500, the decoding network is constrained to contain only the wake word, which means the input sequence of the prediction network is fixed for a given wake word. After the user decides the wake word 344, hidden vectors of the prediction network can be computed in and stored in the LUT 444. Instead of operating a prediction network, as previously done by others, the hidden vectors of a prediction network operating on the wake word 344 can be stored in the LUT 444. This saves significant computation and memory resources and allows more devices to perform wake word detection.

The joint network 446 joins the two hidden vectors 452, 456 together and outputs the posterior of the predicted label from the LUT 444 and the hidden vector 452. The joint network 446 can comprise feed forward layers that compute logits 458 for every frame and label. The logits 458 can be converted to a probability distribution 460 over the labels by a softmax layer 448.

The system 400 of FIG. 4 is a subset of the system 500 of FIG. 5. The system 500 includes some components from the system 400 and the system 300. The systems 300, 400, 500 are efficient (in terms of computational and memory efficiency) wake word spotting systems. The systems 300, 400, 500 can check whether a segment of speech contains the wake word or not. Popular wake word spotting systems in products pre-define a wake word in and the user can only use that word to wake up the personal assistant (Cortana® with keyword "Cortana").

The customized wake word detection systems 300, 400, 500 allow users or product developers to use any custom wake word. Given a desired wake word, the wake word graph generator 144 of the wake word model engine 142 can generate a decoding graph 332 specifically for only the custom wake word and different pronunciations thereof. Then audio is passed through the decoding graph 332 with either the AM 330 and the LM 334, or the RNNT model with the LUT 444. The output can be provided to a beam search decoder 338 that produces a confidence score which shows how likely the audio contains the wake word. The confidence score is then compared with a predefined threshold to determine whether the wake word is present at operation 340.

Similar to the system 300 discussed previously, the NNs of the system 400, 500 can be trained using whole word (WW) phonemes to model special words, like digits and letters or the wake word. Digits and letters are difficult to recognize in automatic speech recognition compared with common words. For these special words, specific phonemes can be used in place of standard phonemes to represent the pronunciations. These specific phonemes are sometimes called WW phones.

It can be advantageous to reduce the size and processing latency of the system 300, 400, 500. The system 300, 400, 500 can operate on the device 110, which can be memory or processing power limited. One way of reducing the memory overhead of the system 300, 400, 500 is to use singular vector decomposition (SVD) on matrices (e.g., weight matrices) thereof. Using SVD reduces (compresses) the model size and computational cost while still retaining model accuracy after the compression.

In SVD, a single weight matrix is replaced with two weight matrices. This means that a single layer of the NN is replaced with two layers of the NN. The advantage of this, is that a single weight matrix can be replaced with two matrices that, in combination, include fewer parameters than the single weight matrix.

Figure 6:
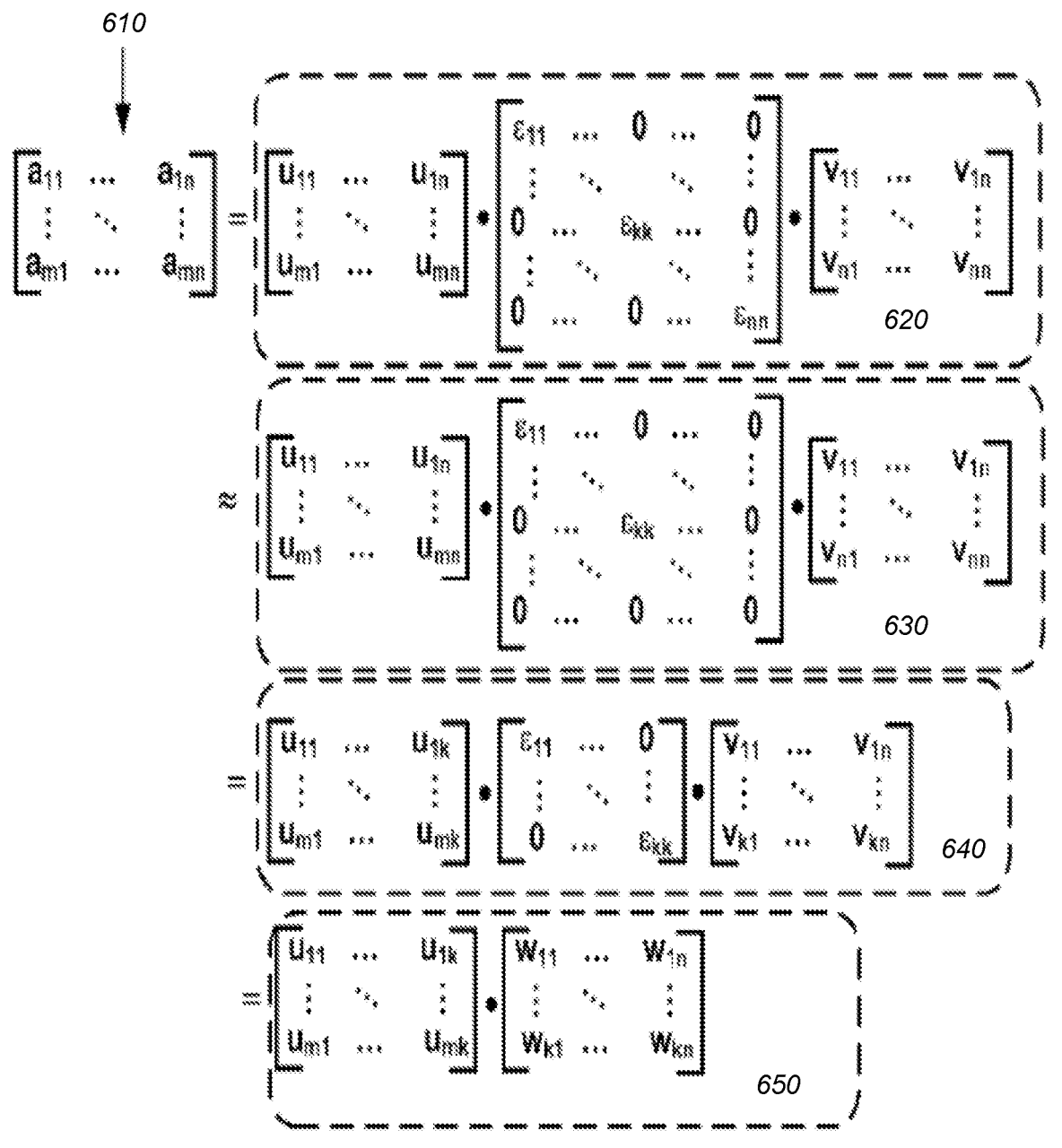

FIG. 6 depicts decomposing a weight matrix of an NN model into two matrices with smaller dimensions. A weight matrix A 610 is an m×n weight matrix in the NN model. Applying SVD to weight matrix A 610 produces $A_{m \times n} = U_{m \times n} \Sigma_{n \times n} V_{n \times n}^T$ (formula (1)) 320 where $\Sigma$ is a diagonal matrix with A's singular values on the diagonal in the decreasing order. The m columns of U and the n columns of V are referred to as the left-singular vectors and right singular vectors of A, respectively. Since A is a sparse matrix, a large part of A's singular values are typically very small. Setting the small values to 0 does not considerably change the values of elements in matrix A.

Element 630 of FIG. 6 shows keeping the largest k singular values of A. Keeping the largest k singular values of A, formula (1) may be rewritten as $A_{m \times n} = U_{m \times k} \Sigma_{k \times k} V_{k \times n}^T$ as can be seen in element 640. This may further be represented as $A_{m \times n} = U_{m \times k} W_{k \times nk}$ where $W_{k \times nk} = \Sigma_{k \times k} V_{k \times n}^T$ as can be seen in element 350 that shows matrix A decomposed into two smaller matrices U and W.

As can be seen by referring to FIG. 6, the number of parameters changes from m*n in matrix A 610 to (m+n)k. The DNN model size is reduced when k is much smaller than m and n. The value of k can be set to a pre-decided value or determined using information from the weight matrices being reduced.

As previously discussed, the LUT 444 can store pre-computed vectors from a prediction network (e.g., a wake word graph 332). The input of the prediction network can be the last predicted label (the prior label 454). After the user decides the wake word 344, hidden vectors of the prediction network can be computed in and stored in the LUT 444. Instead of operating a prediction network, as previously done by others, the hidden vectors of a prediction network operating on the wake word 344 can be stored in the LUT 444. This saves significant computation and memory resources and allows more devices to perform wake word detection.

An RNN, such as an RNNT, operates based on current inputs and prior outputs. In the context of detecting a custom wake word, the history can cause the accuracy of the RNN to decrease. This is, at least in part, because whether the wake word 344 is present in an utterance now is independent of what was uttered a specified amount of time (e.g., five seconds, ten seconds, thirty seconds, one minute, greater or lesser time, or some amount of time therebetween) in the past.

To help retain accuracy of the RNN, CTC, language model or the decoder they can be reset periodically (e.g., every five seconds, ten seconds, thirty seconds, one minute, greater or lesser time, or some amount of time therebetween). There is a small chance, that the reset can occur while the user 130 is uttering the wake word 344. Thus, a short rewind of the audio 450 can increase the accuracy and stability. The amount of rewind can be a maximum amount of time it takes the user 130 to utter the wake word 344 or other amount of time. In some embodiments, the reset can occur after a wake word is detected.

Another technique for reducing the size of the model and decreasing latency in identifying a wake word includes compressing the model with quantization, such as 8-bit or 16-bit quantization. The quantization can be applied to 32-bit floating point weights in the encoder 442 and joint network 446 matrices. This helps to compress the model size by about 4×. This compression reduces the amount of data that has to be read from main memory during execution in case the matrix weights are not already preloaded in central processing unit (CPU) cache. This helps increase the efficiency of vector-matrix multiplies of the on-chip processing elements in case the weights are already resident in the CPU cache. Many current hardware architectures implement multiply-add single instruction, multiple data (SIMD) operations, which can execute on registers of up to 256-bits. In case those registers contain 8-bit values, a single SIMD instruction can multiply and add 32 elements in a single cycle, 4 times more than if those registers contained 32-bit floating point values.

To preserve the NN accuracy and fully utilize the range of (−128,127), an asymmetrical range of the values of a single matrix row can be allowed, then compressed down to the target range allowed by the quantization. The quantized values can be stored to memory.

Figure 7:
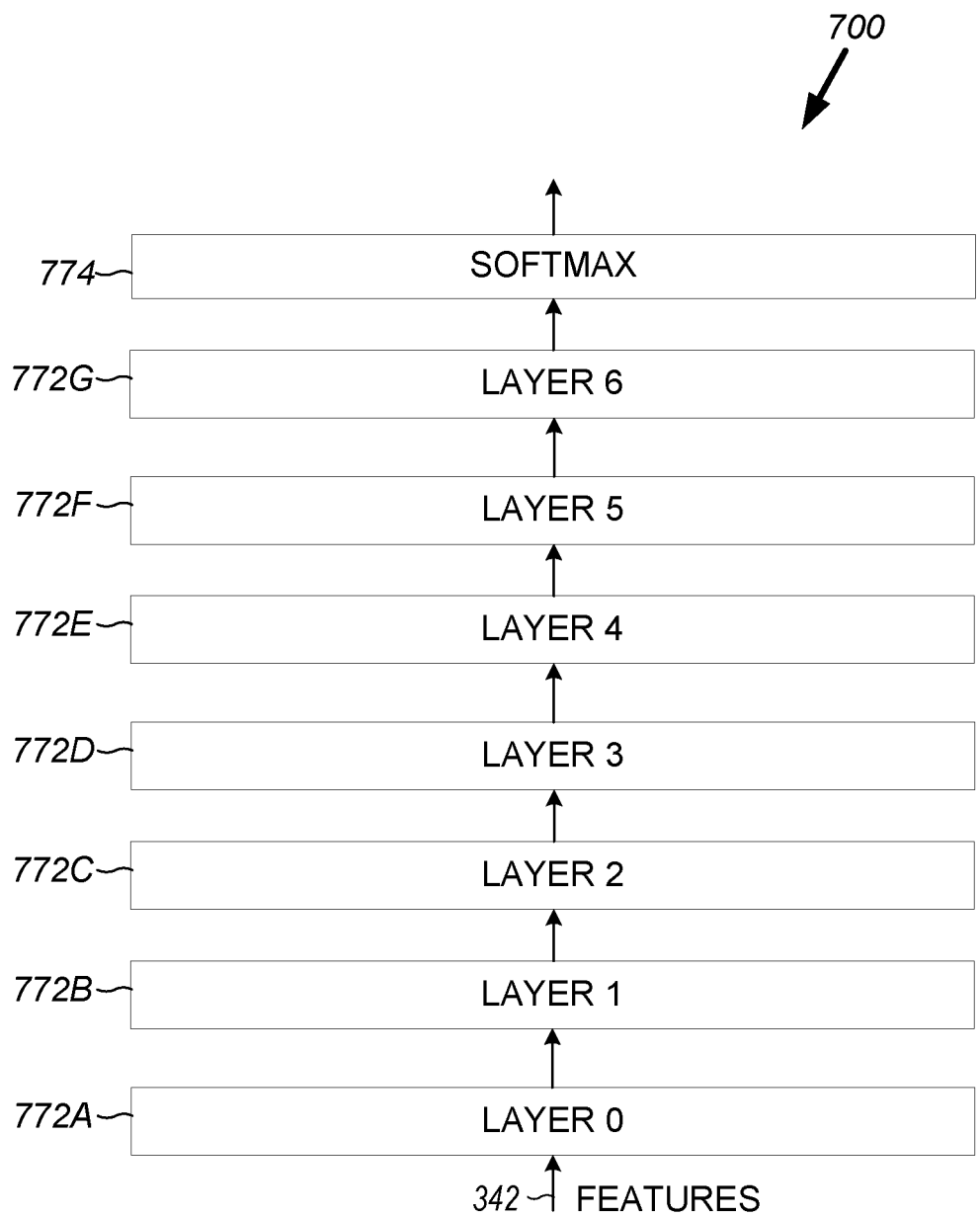
FIG. 7 illustrates, by way of example, a logical block diagram of an embodiment of a quantized NN.

FIG. 7 illustrates, by way of example, a diagram of an embodiment of a quantized NN 700. The NN 700 can be part of the AM 330, the encoder 442 or other part of a model. The NN 700 as illustrated includes seven quantized layers 772 and a softmax layer 774. The quantized layers 772A, 772B, 772C, 772D, 772E, 772F, 772G can be quantized to a same or different number range. In some embodiments, the quantized layers 772A and 772G are quantized to 16-bits and the quantized layers 772B, 772C, 772D, 772E, 772F are quantized to 8-bits. This configuration allows for a smaller model without giving up much accuracy.

Figure 8:
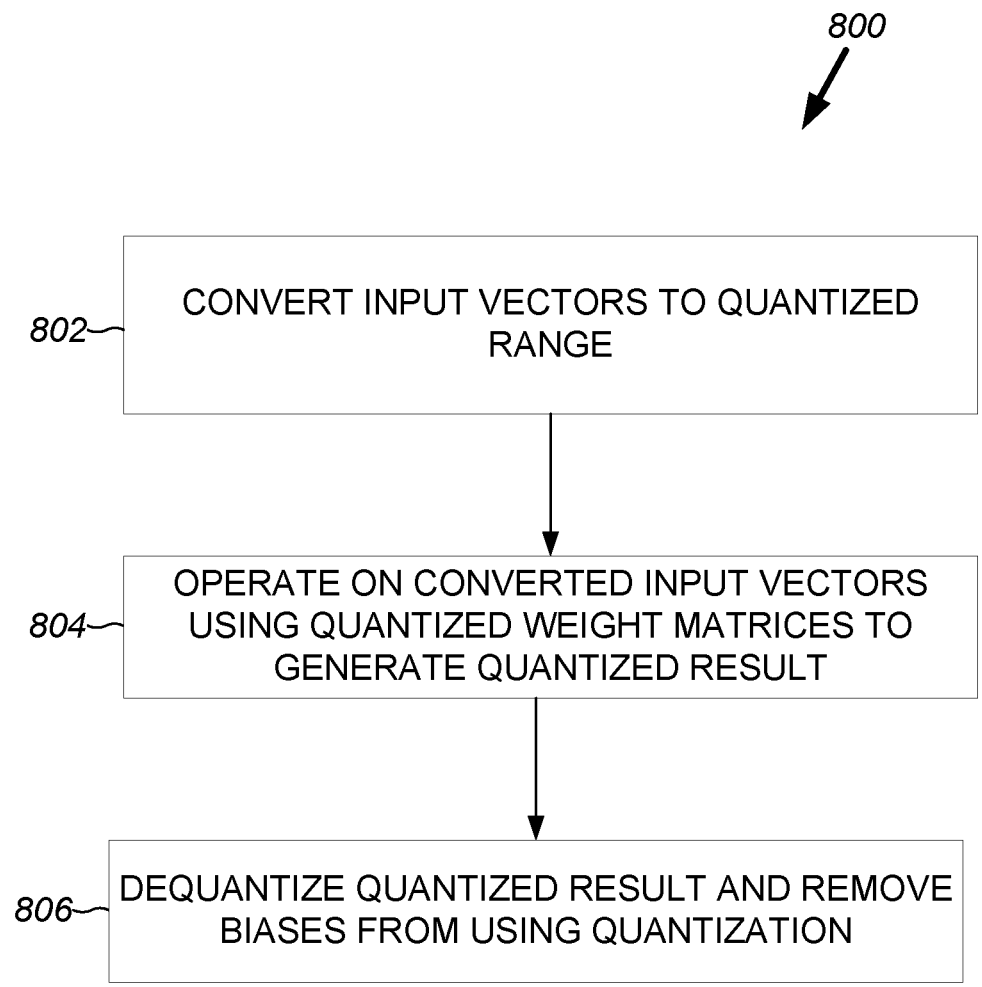
FIG. 8 illustrates, by way of example, a flow diagram of an embodiment of a method for using quantized matrices at runtime.

FIG. 8 illustrates, by way of example, a diagram of an embodiment of a method 800 for using quantized matrices at runtime. The method 800 as illustrated includes: converting input vectors to a quantized range (e.g., 8-bit, 16-bit, etc.), at operation 820; operating on the converted input vectors using a quantized weight matrix to generate quantized result, at operation 840; and dequantizing the quantized result and removing biases realized from using quantization, at operation 860. The operation 820 can be performed using a same asymmetrical quantization scheme used to quantize the weight matrices of the model. The operation 840 can be performed using SIMD instructions. The operation 860 can include converting the dequantized result to floating point (e.g., 32-bit, 64-bit, etc.).

Figure 9:
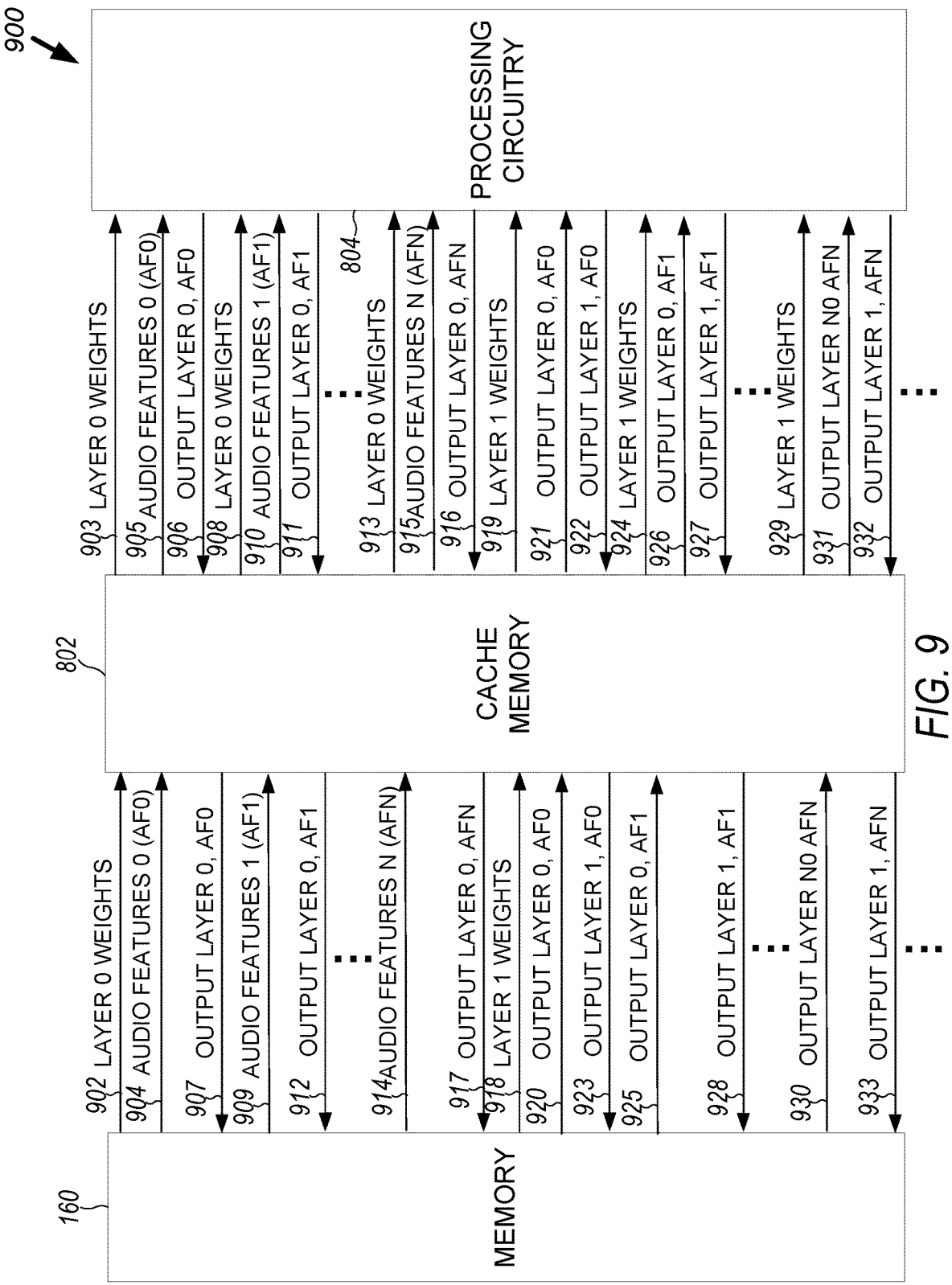
FIG. 9 illustrates, by way of example, a logical block diagram of an embodiment of a system configured for execution batching.

FIG. 9 illustrates, by way of example, a diagram of an embodiment of a system 900 configured for execution batching. The system 900 as illustrated includes the memory 160, processing circuitry 804, and a cache memory 802. The processing circuitry 804, the cache memory 802, and the memory 160 can be part of the wake word model engine 142. However, the operations performed by the system 800 can be implemented using the device 110. The operations illustrated in FIG. 9 can be performed in the order illustrated in FIG. 9, with some variation possible.

At operation 902, weights for a first layer of an NN can be loaded from the memory 160 into a cache memory 802. At operation 903, the weights for the first layer of the NN can be provided to the processing circuitry 804 for execution. At operation 904 first audio features from a first audio frame of an audio sample can be provided to the cache memory 802. At operation 905, the audio features from the first audio frame can be provided to the processing circuitry 804. The processing circuitry 804 can operate on the audio features using the NN configured using the layer weights provided at operation 903. The processing circuitry 804 can provide a corresponding output of the first layer based on the audio features from the first audio frame to the cache memory 802 at operation 906. At operation 907, the output of the first layer based on the first audio frame can be provided to the memory 160.

The process of operations 903-907 then repeats for a next audio frame at operations 908-912, and a next audio frame, until an Nth audio frame is processed at operations 913-917. After N (N>1) audio frames have been processed by the first layer of the NN, weights for a second layer of the NN can be loaded from the memory 160 into the cache memory 802, at operation 918. Then the operations 903-917 can be repeated at operations 918-933, with the input being different and the weights of the layer or configuration of the layer being different. The input can be a respective output from the first layer (the immediately previous layer). The NN layer weights or configuration can be different.

An advantage provided by the technique of FIG. 8 can be provided by holding NN layer P parameters in CPU cache and processing data of multiple frames while parameters remain in cache. Consider a typical application in which layer 1 processes a first audio frame, then layer 2 processes the output of the layer 1, then layer 3 processes the output of the layer 2, and so on until layer P processes the output of layer P-1. This process then typically repeats for every single frame. In this process, the CPU loads from memory (the layer parameters) over and over again for every frame. Using the technique of FIG. 8, it takes only one memory access to load the memory into CPU cache for N audio frames, and instead reads from the CPU cache memory 802 to load the parameters. This is sometimes called execution batching. This process includes, instead of N*P memory accesses for parameters of N frames and P layers, there is only P memory accesses for the parameters. This provides significant runtime speed up as memory 160 access takes significantly longer than cache memory 802 access.

A variation in the order of operations discussed regarding FIG. 9 can include aggregating output of the first layer at the cache memory 802 and doing a batch write to the memory 160 (or not writing to the memory 160 if the cache memory 802 is sufficiently large). This can save time in by performing fewer write operations to the memory 160. Yet another variation in the order of operations discussed regarding FIG. 9 can include operating, using a next layer, on the outputs of a layer in a different order than the outputs were generated.

FIG. 10 illustrates, by way of example, a diagram of an embodiment of a beam search decoding trie 1000 for the word "computer". Note how the beam search decoding trie 1000 allows for multiple pronunciations of the same word. The trie 1000 includes phonemes 880 and vectors 882 that are retrieved while traversing the trie 1000. The alphabet of the trie 1000 is composed of only the phonemes of the wake word 344, which is "computer" in the example of FIG. 10.

The trie for different wake words is different and can be generated by the wake word decode graph generator 144 of the wake word model engine 142, such as offline.

Frame stacking includes providing features of multiple, consecutive frames as input to the wake word detection technique. The stacked frame includes audio features from multiple consecutive frames.

Frame skipping includes presenting only a subset of all frames as input to the wake word detection technique. When used with frame stacking, the knowledge of all frames can still be present, but with fewer operations performed by the wake word detection technique.

An advantage of embodiments includes leveraging a general automatic speech recognition (ASR) (e.g., universal acoustic model and language model) for wake word detection. Such a system reduces development effort as the ASR already exists. Further, using the wake word detection with the ASR improves the accuracy of the ASR. This is due, at least in part, to making the ASR recognize the phonemes of the wake word with fewer FAs and more CAs. These phonemes are very likely to occur in other words and will be more accurately detected by the wake word detection with ASR.

An advantage of embodiments includes single-pass (low latency) verification of a wake word. Further, embodiments can do a single-pass verification of multiple wake words. There is nothing that limits the number of wake words that can be chosen by the user 130. The components that might change to accommodate multiple wake words include the decoding graph 332 and the LM 334 (if the wake words are removed from the BLM 334).

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 11:
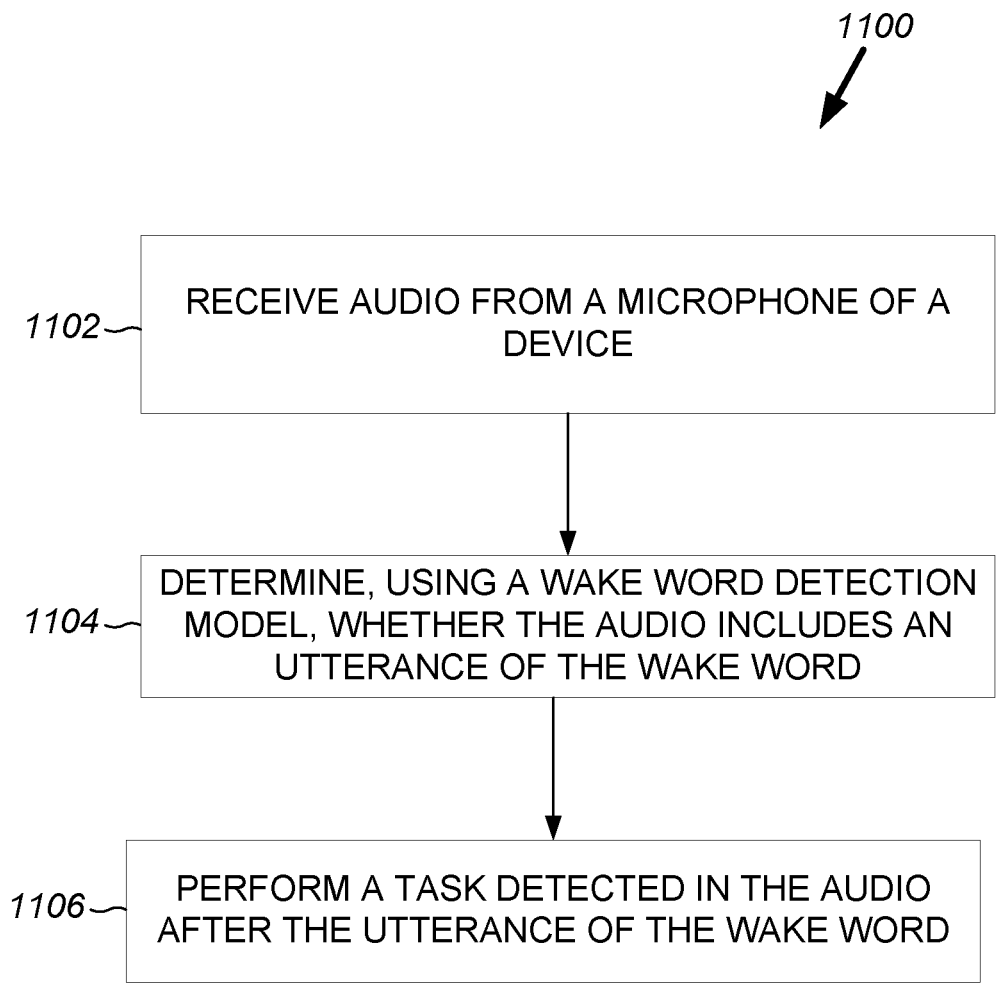
FIG. 11 illustrates, by way of example, a flow diagram of an embodiment of a method for on-device custom wake word detection.

FIG. 11 illustrates, by way of example, a diagram of an embodiment of a method 1100 for on-device custom wake word detection. The method 1100 as illustrated includes receiving audio from a microphone of a device, at operation 1102; determining, using a wake word detection model, whether the audio includes an utterance of the wake word, at operation 1104; and performing a task detected in the audio after the utterance of the wake word, at operation 1106. The wake word detection model can include an RNNT and LUT indicating a hidden vector to be generated in response to a phoneme. The wake word detection model can be trained using standard phonemes and whole word phonemes.

The method 1100 can further include resetting the wake word detection model to erase a history of processed audio. The reset can occur in response to determining one of the wake word was uttered and a specified period of time has elapsed. The method 1100 can further include, wherein the wake word detection model is compressed using singular value decomposition (SVD). The method 1100 can further include, wherein the wake word detection model includes weights quantized to 8-bit or 16-bit values.

The method 1100 can further include receiving the wake word from a user. The method 1100 can further include providing the wake word to a wake word model engine. The method 1100 can further include receiving from the wake word model engine, a wake word graph of the wake word indicating a phoneme sequence of the wake word and alternate pronunciations of the wake word. The method 1100 can further include, wherein the wake word graph is part of the wake word detection model. The method 1100 can further include receiving from the wake word model engine, a wake word graph of the wake word indicating a phoneme sequence of the wake word and alternate pronunciations of the wake word and a background language model with unigrams and bi-grams of the wake word removed therefrom. The method 1100 can further include, wherein the wake word graph and the background language model are part of the wake word detection model.

FIG. 12 illustrates, by way of example, a block diagram of an embodiment of a machine 1200 (e.g., a computer system) to implement one or more embodiments. One example machine 1200 (in the form of a computer), may include a processing unit 1202, memory 1203, removable storage 1210, and non-removable storage 1212. Although the example computing device is illustrated and described as machine 1200, the computing device may be in different forms in different embodiments. For example, the computing device may instead be a smartphone, a tablet, smartwatch, or other computing device including the same or similar elements as illustrated and described regarding FIG. 12. Devices such as smartphones, smart speakers, tablets, and smartwatches are generally collectively referred to as mobile devices. Further, although the various data storage elements are illustrated as part of the machine 1200, the storage may also or alternatively include cloud-based storage accessible via a network, such as the Internet.

Memory 1203 may include volatile memory 1214 and non-volatile memory 1208. The machine 1200 may include—or have access to a computing environment that includes—a variety of computer-readable media, such as volatile memory 1214 and non-volatile memory 1208, removable storage 1210 and non-removable storage 1212. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 1200 may include or have access to a computing environment that includes input 1206, output 1204, and a communication connection 1216. Output 1204 may include a display device, such as a touchscreen, that also may serve as an input device. The input 1206 may include one or more of a touchscreen, touchpad, mouse, keyboard, camera, one or more device-specific buttons, one or more sensors integrated within or coupled via wired or wireless data connections to the machine 1200, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1202 (sometimes called processing circuitry) of the machine 1200. A hard drive, CD-ROM, and RAM are some examples of articles including a non-transitory computer-readable medium such as a storage device. For example, a computer program 1218 may be used to cause processing unit 1202 to perform one or more methods or algorithms described herein.

Processing circuitry includes electric or electronic components configured to perform operations of hardware, an application, or engine. The components can include a transistor, resistor, capacitor, diode, inductor, logic gate (e.g., AND, OR, XOR, negate, buffer, or the like), multiplexer, switch, oscillator, power supply, analog to digital converter, digital to analog converter, CPU, field programmable gate array (FPGA), application specific integrated circuit (ASIC), graphics processing unit, or the like.

Additional Notes and Examples:

Example 1 includes a device comprising memory including model parameters that define a recurrent neural network transducer (RNNT) wake word detection model and a lookup table (LUT) indicating a hidden vector to be generated in response to a phoneme of a user-specified wake word, a microphone to capture audio, processing circuitry to receive the audio from the microphone, determine, using the wake word detection model, whether the audio includes an utterance of the wake word, and perform a task detected in the audio after the wake word.

In Example 2, Example 1 can further include, wherein the wake word detection model is trained using standard phonemes and whole word phonemes.

In Example 3, at least one of Examples 1-2 can further include, wherein the processing circuitry is further to reset the wake word detection model to erase a history of processed audio.

In Example 4, Example 3 can further include, wherein the reset occurs in response to determining one of the wake word was uttered and a specified period of time has elapsed.

In Example 5, at least one of Examples 1-4 can further include, wherein the wake word detection model is compressed using single value decomposition (SVD).

In Example 6, Example 5 can further include, wherein the wake word detection model includes weights quantized to 8-bit or 16-bit values.

In Example 7, at least one of Examples 1-6 can further include, wherein the processing circuitry is further to receive the wake word from a user, provide the wake word to a wake word model engine, and receive from the wake word model engine, a wake word graph of the wake word indicating a phoneme sequence of the wake word and alternate pronunciations of the wake word, wherein the wake word graph is part of the wake word detection model.

In Example 8 the processing circuitry is further to receive the wake word from a user, provide the wake word to a wake word model engine, and receive from the wake word model engine, a wake word graph of the wake word indicating a phoneme sequence of the wake word and alternate pronunciations of the wake word and a background language model with unigrams and bi-grams of the wake word removed therefrom, wherein the wake word graph and the background language model are part of the wake word detection model.

Example 9 includes a method of on-device wake word detection consistent with the teaching of this disclosure.

Example 10 includes a non-transitory machine-readable medium including instructions that, when executed by a machine, cause the machine to perform operations of on-device wake word detection consistent with the teaching this disclosure.

Means for Performing the Method of Example 9.

The operations, functions, or algorithms described herein may be implemented in software in some embodiments. The software may include computer executable instructions stored on computer or other machine-readable media or storage medium, such as one or more non-transitory memories (e.g., a non-transitory machine-readable medium) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

NNs are computational structures that are loosely modeled on biological neurons. Generally, NNs encode information (e.g., data or decision making) via weighted connections (e.g., synapses) between nodes (e.g., neurons). Modern NNs are foundational to many machine learning applications.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The correct operation of most NNs relies on accurate weights. However, NN designers do not generally know which weights will work for a given application. Instead, a training process is used to arrive at appropriate weights. NN designers typically choose a number of neuron layers or specific connections between layers including circular connection. Instead, a training process generally proceeds by selecting initial weights, which may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc. For machine learning of the intent, a supervised technique can be employed.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A device comprising:
    memory including model parameters that define a custom wake word detection model, the wake word detection model including a recurrent neural network transducer (RNNT) and a lookup table (LUT), the LUT indicating a hidden vector to be provided in response to a phoneme of a user-specified wake word;
    a microphone to capture audio;
    processing circuitry to:
        receive the audio from the microphone;
        determine, using the wake word detection model, whether the audio includes an utterance of the user-specified wake word;
        wake up a personal assistant after determining the audio includes the utterance of the user-specified wake word; and
        reset, in response to determining one of the wake word was uttered and a specified period of time has elapsed, the wake word detection model to erase a history of processed audio.

2. The device of claim 1, wherein the wake word detection model is trained using standard phonemes and whole word phonemes.

3. The device of claim 1, wherein the wake word detection model is compressed using single value decomposition (SVD).

4. The device of claim 3, wherein the wake word detection model includes weights quantized to 8-bit or 16-bit values.

5. The device of claim 1, wherein the processing circuitry is to:
receive the wake word from a user;
provide the wake word to a wake word model engine; and
receive from the wake word model engine, a wake word graph of the wake word indicating a phoneme sequence of the wake word and alternate pronunciations of the wake word;
wherein the wake word graph is part of the wake word detection model.

6. The device of claim 1, wherein the processing circuitry is to:
receive the wake word from a user;
provide the wake word to a wake word model engine; and
receive from the wake word model engine, a wake word graph of the wake word indicating a phoneme sequence of the wake word and alternate pronunciations of the wake word and a background language model with unigrams and bi-grams of the wake word removed therefrom;
wherein the wake word graph and the background language model are part of the wake word detection model.

7. A method of on-device custom wake word detection comprising:
receiving audio from a microphone of a device;
determining, using a wake word detection model, whether the audio includes an utterance of a user-specified wake word, the wake word detection model including a recurrent neural network transducer (RNNT) and a lookup table (LUT), the LUT indicating a hidden vector to be provided in response to a phoneme of a user-specified wake word;
waking up a personal assistant after determining the audio includes the utterance of the user-specified wake word; and
resetting, in response to determining one of the wake word was uttered and a specified period of time has elapsed, the wake word detection model to erase a history of processed audio.

8. The method of claim 7, wherein the wake word detection model is trained using standard phonemes and whole word phonemes.

9. The method of claim 7, wherein the wake word detection model is compressed using single value decomposition (SVD).

10. The method of claim 9, wherein the wake word detection model includes weights quantized to 8-bit or 16-bit values.

11. The method of claim 7, further comprising:
receiving the user-specified wake word from a user;
providing the user-specified wake word to a wake word model engine; and
receiving from the wake word model engine, a wake word graph of the user-specified wake word indicating a phoneme sequence of the user-specified wake word and alternate pronunciations of the user-specified wake word;
wherein the wake word graph is part of the wake word detection model.

12. A non-transitory machine-readable medium including instructions that, when executed by a machine, cause the machine to perform operations for on-device custom wake word detection, the operations comprising:
receiving audio from a microphone of a device;
determining, using a wake word detection model, whether the audio includes an utterance of a user-specified wake word, the wake word detection model including a recurrent neural network transducer (RNNT) and a lookup table (LUT), the LUT indicating a hidden vector to be provided in response to a phoneme of a user-specified wake word;
waking up a personal assistant after determining the audio includes the utterance of the user-specified wake word; and
resetting, in response to determining one of the wake word was uttered and a specified period of time has elapsed, the wake word detection model to erase a history of processed audio.

13. The non-transitory machine-readable medium of claim 12, wherein the wake word detection model is trained using standard phonemes and whole word phonemes.

14. The non-transitory machine-readable medium of claim 12, wherein the operations further comprise:
receiving the user-specified wake word from a user;
providing the user-specified wake word to a wake word model engine; and
receiving from the wake word model engine, a wake word graph of the user-specified wake word indicating a phoneme sequence of the user-specified wake word and alternate pronunciations of the user-specified wake word;
wherein the wake word graph is part of the wake word detection model.

15. The non-transitory machine-readable medium of claim 12, wherein the operations further include:
receiving the wake word from a user;
providing the wake word to a wake word model engine; and
receiving from the wake word model engine, a wake word graph of the wake word indicating a phoneme sequence of the wake word and alternate pronunciations of the wake word and a background language model with unigrams and bi-grams of the wake word removed therefrom;
wherein the wake word graph and the background language model are part of the wake word detection model.

* * * * *